(12) United States Patent
Sim et al.

(10) Patent No.: US 9,838,713 B1
(45) Date of Patent: Dec. 5, 2017

(54) METHOD FOR FAST TRANSFORM CODING BASED ON PERCEPTUAL QUALITY AND APPARATUS FOR THE SAME

(71) Applicant: KWANGWOON UNIVERSITY INDUSTRY-ACADEMIC COLLABORATION FOUNDATION, Seoul (KR)

(72) Inventors: Donggyu Sim, Seoul (KR); Yongjo Ahn, Seoul (KR)

(73) Assignee: Kwangwoon University-Academic Collaboration Foundation, Seoul (KR)

( * ) Notice: Subject to any disclaimer, the term of this patent is extended or adjusted under 35 U.S.C. 154(b) by 0 days.

(21) Appl. No.: 15/453,257

(22) Filed: Mar. 8, 2017

(30) Foreign Application Priority Data

Jan. 25, 2017 (KR) .......................... 10-2017-0011657

(51) Int. Cl.
*H04N 19/154* (2014.01)
*H04N 19/60* (2014.01)
(Continued)

(52) U.S. Cl.
CPC .......... *H04N 19/60* (2014.11); *H04N 19/115* (2014.11); *H04N 19/147* (2014.11); *H04N 19/154* (2014.11); *H04N 19/176* (2014.11)

(58) Field of Classification Search
None
See application file for complete search history.

(56) References Cited

U.S. PATENT DOCUMENTS

| 6,360,017 B1 * | 3/2002 | Chiu | H04N 19/176 |
| | | | 375/240.02 |
| 6,366,705 B1 * | 4/2002 | Chiu | H04N 19/176 |
| | | | 375/240.02 |

(Continued)

FOREIGN PATENT DOCUMENTS

| KR | 101305093 B1 * | 9/2013 |
| KR | 101327709 B1 | 11/2013 |

OTHER PUBLICATIONS

A. S. Dias, M. Siekmann, S. Bosse, H. Schwarz, D. Marpe and M. Mrak, "Rate-distortion optimised quantisation for HEVC using spatial just noticeable distortion," 2015 23rd European Signal Processing Conference (EUSIPCO), Nice, 2015, pp. 110-114 (Conference ended Sep. 4, 2015).*

(Continued)

*Primary Examiner* — Dave Czekaj
*Assistant Examiner* — Tyler W Sullivan
(74) *Attorney, Agent, or Firm* — Dinsmore & Shohl LLP

(57) ABSTRACT

A method for fast transform coding in image compression is provided. The method includes performing prediction with respect to a current block, calculating a prediction error with respect to the current block, performing transform and quantization with respect to the current block, performing dequantization and inverse transform with respect to a transform coefficient generated through the transform and quantization, generating a reconstruction signal by summing a prediction signal generated in the performing of the prediction and a residual signal generated in the performing of the dequantization and inverse transform, calculating a rate-distortion (RD) cost related to the reconstruction signal, determining whether a size of the current block is a minimum block size, partitioning the current block into a plurality of sub-blocks, and performing transform coding with (Continued)

respect to the sub-blocks in response to determination that the size of the current block is not the minimum block size.

8 Claims, 4 Drawing Sheets

(51) Int. Cl.
*H04N 19/147* (2014.01)
*H04N 19/115* (2014.01)
*H04N 19/176* (2014.01)

(56) References Cited

U.S. PATENT DOCUMENTS

| | | | | |
|---|---|---|---|---|
| 7,280,689 B2 * | 10/2007 | Bilobrov | ................ | H04N 19/61 |
| | | | | 375/240.24 |
| 9,036,712 B1 * | 5/2015 | Cote | .................... | H04N 19/139 |
| | | | | 375/240.24 |
| 2011/0243228 A1 * | 10/2011 | Ngan | .................. | H04N 19/159 |
| | | | | 375/240.13 |
| 2014/0169451 A1 * | 6/2014 | Cohen | ................. | H04N 19/176 |
| | | | | 375/240.03 |
| 2016/0353131 A1 * | 12/2016 | Kim | ..................... | H04N 19/176 |

OTHER PUBLICATIONS

Jaeil Kim et al., "An HEVC-Compliant Perceptual Video Coding Scheme Based on JND Models for Variable Block-Sized Transform Kernels", IEEE Transactions on Circuits and Systems for Video Technology, Nov. 2015, pp. 1786-1800, vol. 25, No. 11.

* cited by examiner

METHOD FOR FAST TRANSFORM CODING BASED ON PERCEPTUAL QUALITY AND APPARATUS FOR THE SAME

CROSS-REFERENCE TO RELATED APPLICATION(S)

This application claims priority to Korean Patent Application No. 10-2017-0011657 filed on Jan. 25, 2017, the entire contents of which are incorporated herein by reference.

BACKGROUND

1. Field

One or more example embodiments relate to a method for fast transform coding based on a perceptual quality and apparatus for the same, and more particularly, to a method for fast transform coding based on a subjective image quality such as a perceptual quality and apparatus for the same that may speed up transform coding video encoding.

2. Description of Related Art

Recently, video compression technology has been widely used. For example, video compression standard technology called high efficiency video coding (HEVC) has been established. Such compression technology is very complex, and thus it is not easy to implement an encoder that produces a maximum performance. In particular, to ensure a high compression performance of video compression, a method of partially or completely performing coding using a number of coding methods and selecting an optimal compression method from a number of compression methods based on image qualities and compression ratios thereof at the same time is used.

Particularly, the compression method such as HEVC performs transform coding, and various block sizes and various kernels may be used for the transform coding. One or more example embodiments relate to a method for fast coding based on a subjective image quality in a combination of such various block sizes.

SUMMARY

An aspect provides a method and apparatus for fast transform coding that may maintain a subjective image quality while speeding up transform coding in performing transform coding after prediction when performing video compression.

Another aspect also provides a method and apparatus for fast transform coding based on a perceptual quality that may improve a compression speed without causing a loss of image quality using a method of skipping coding with respect to a residual of a block, rather than performing transform corresponding to a size of the block in a case in which a residual signal is not perceived in an aspect of subjective image quality.

Still another aspect also provides a method and apparatus that may improve a compression speed without causing a loss of subjective image quality by removing a process of partitioning into smaller blocks at a corresponding position and performing transform coding thereon, rather than performing transform coding in a case in which it is difficult to perceive a residual signal in an aspect of subjective image quality in a transform coding process when performing video compression.

The technical tasks obtainable from the present disclosure are non-limited by the above-mentioned technical tasks. And, other unmentioned technical tasks can be clearly understood from the following description by those having ordinary skill in the technical field to which the present disclosure pertains.

According to an aspect, there is provided an apparatus for fast transform coding in image compression, the apparatus including a predictor configured to perform prediction with respect to a current block, an image quality calculator configured to calculate a prediction error with respect to the current block, a transform/quantization performer configured to perform transform and quantization with respect to the current block, a dequantization/inverse transform performer configured to perform dequantization and inverse transform with respect to a transform coefficient generated through the transform and quantization, a reconstructor configured to generate a reconstruction signal by summing a prediction signal generated by the predictor and a residual signal generated by the dequantization/inverse transform performer, a rate-distortion (RD) calculator configured to calculate an RD cost related to the reconstruction signal, a minimum block determiner configured to determine whether a size of the current block is a minimum block size, a sub-block transform coding performer configured to partition the current block into a plurality of sub-blocks and perform transform coding with respect to the sub-blocks when the minimum block determiner determines that the size of the current block is not the minimum block size, a sub-block RD summer configured to sum respective RD costs for the plurality of sub-blocks, and a transform unit (TU) determiner configured to determine a TU for transform coding based on a comparison of the RD cost for the current block and the RD costs for the sub-blocks.

The image quality calculator may be configured to calculate the prediction error with respect to the current block based on a comparison with a just noticeable distortion (JND) value for evaluating whether a human is able to perceive. The apparatus may further include an image quality evaluator configured to determine a transform coding method based on the prediction error calculated by the image quality calculator. The apparatus may further include an all-zero transform performer configured to set all transform coefficients to "0" in a case in which the prediction error calculated by the image quality calculator is within a predetermined reference range.

The image quality calculator may be configured to calculate the prediction error based on the following equation, $$VR(i, x, y) = \begin{cases} 1, & |orig(i, x, y) - pred(i, x, y)| > JND_x(i, x, y) \\ 0, & \text{otherwise} \end{cases},$$

wherein orig(i, x, y) denotes an original image, pred(i, x, y) denotes a prediction image, and $JND_s$(i, x, y) denotes a JND value in a spatial domain.

According to another aspect, there is also provided a method for fast transform coding in image compression, the method including performing prediction with respect to a current block, calculating a prediction error with respect to the current block, performing transform and quantization with respect to the current block, performing dequantization and inverse transform with respect to a transform coefficient generated through the transform and quantization, generating a reconstruction signal by summing a prediction signal generated in the performing of the prediction and a residual signal generated in the performing of the dequantization and inverse transform, calculating an RD cost related to the reconstruction signal, determining whether a size of the current block is a minimum block size, partitioning the current block into a plurality of sub-blocks, and performing transform coding with respect to the sub-blocks in response to determination that the size of the current block is not the minimum block size, summing respective RD costs for the plurality of sub-blocks, and determining a TU for transform coding based on a comparison of the RD cost for the current block and the RD costs for the sub-blocks.

The calculating of the prediction error with respect to the current block may include calculating the prediction error with respect to the current block based on a comparison with a JND value for evaluating whether a human is able to perceive. The method may further include determining a transform coding method based on the prediction error. The method may further include setting all transform coefficients to "0" in a case in which the prediction error is within a predetermined reference range.

The calculating of the prediction error with respect to the current block may include calculating the prediction error based on the following equation, $$VR(i, x, y) = \begin{cases} 1, & |orig(i, x, y) - pred(i, x, y)| > JND_z(i, x, y) \\ 0, & \text{otherwise} \end{cases},$$

wherein $orig(i, x, y)$ denotes an original image, $pred(i, x, y)$ denotes a prediction image, and $JND_s(i, x, y)$ denotes a JND value in a spatial domain.

Additional aspects of example embodiments will be set forth in part in the description which follows and, in part, will be apparent from the description, or may be learned by practice of the disclosure.

According to an example embodiment, a compression speed may improve without causing a loss of image quality using a method of skipping coding with respect to a residual of a block, rather than performing transform corresponding to a size of the block in a case in which a residual signal is not perceived in an aspect of subjective image quality.

According to an example embodiment, a level of difficulty for human perception may be evaluated based on a just noticeable distortion (JND) based evaluation standard using a method of evaluating a subjective image quality. In response to determination that a residual signal is not perceived by a human based on the evaluated value, coding may be performed under the assumption that the residual signal is "0", rather than performing transform coding, whereby a coding speed may be doubled with little loss of the image quality.

The effects obtainable from the present disclosure are non-limited by the above-mentioned effects. And, other unmentioned effects can be clearly understood from the following description by those having ordinary skill in the technical field to which the present disclosure pertains.

BRIEF DESCRIPTION OF THE DRAWINGS

These and/or other aspects, features, and advantages of the disclosure will become apparent and more readily appreciated from the following description of example embodiments, taken in conjunction with the accompanying drawings of which.

DETAILED DESCRIPTION

Figure 1:
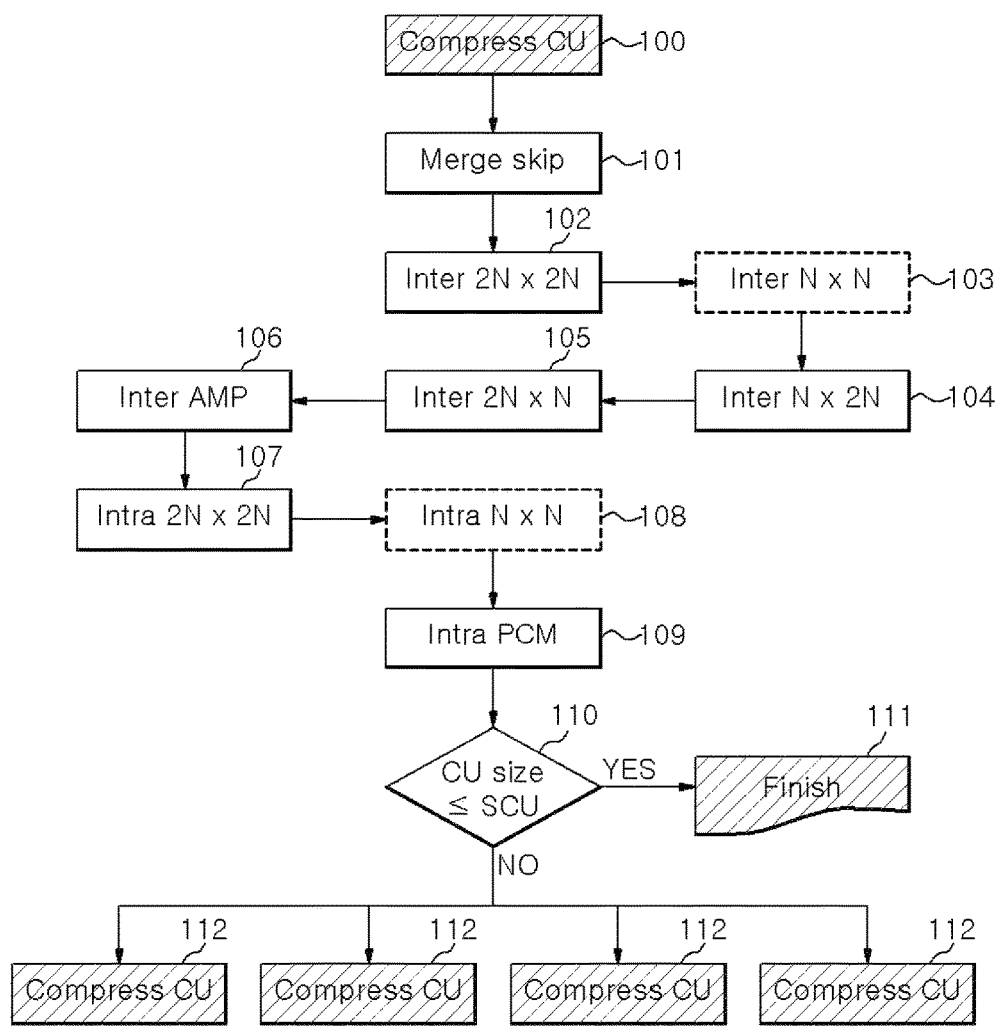
FIG. 1 is a flowchart illustrating a coding method of high efficiency video coding reference model (HEVC HM) according to an example embodiment.

Hereinafter, some example embodiments will be described in detail with reference to the accompanying drawings. Regarding the reference numerals assigned to the elements in the drawings, it should be noted that the same elements will be designated by the same reference numerals, wherever possible, even though they are shown in different drawings. In drawings, parts irrelevant to the description are omitted for the simplicity of explanation, and like reference numerals denote like parts through the whole document.

The terminology used herein is for the purpose of describing particular example embodiments only and is not intended to be limiting. As used herein, the singular forms "a," "an," and "the," are intended to include the plural forms as well, unless the context clearly indicates otherwise.

It will be further understood that the terms "comprises," "comprising," "includes." and/or "including," when used herein, specify the presence of stated features, integers, steps, operations, elements, and/or components, but do not preclude the presence or addition of one or more other features, integers, steps, operations, elements, components, and/or groups thereof.

In addition, terms such as first, second, A, B, (a), (b), and the like may be used herein to describe components. Each of these terminologies is not used to define an essence, order or sequence of a corresponding component but used merely to distinguish the corresponding component from other component(s). Also, in the description of example embodiments, detailed description of well-known related structures or functions will be omitted when it is deemed that such description will cause ambiguous interpretation of the present disclosure.

Furthermore, constituent units included in example embodiments of the present disclosure are independently illustrated to describe different specific functions, and each of the constituent units may not indicate separate hardware or one software element. That is, the respective constituent units are arranged and included for convenience of description. Among the constituent units, two or more constituent units may be combined to serve as one constituent unit, and one constituent unit may be divided into a plurality of constituent units to perform a function. The integrated example embodiment of the constituent units and the divided example embodiments of each constituent unit are included in the claims as long as they do not depart from the spirit of the present disclosure.

FIG. 1 is a flowchart illustrating a coding method of high efficiency video coding reference model (HEVC HM), that is, the overall flow of operation of a coder.

First, when a single image is input into the coder, the image is partitioned into blocks of a predetermined size. A single block is processed as an input of FIG. 1, and such a block is referred to as a coding unit block (CU block). A constituent unit that codes a CU block may be referred to as a CU coder.

A CU coding operation is performed in operation 100. The CU coder may perform predictive coding with respect to a CU using various methods through Merge skip 101, Inter2N×2N 102, InterN×N 103, InterN×2N 104, Inter2N×N 105, Inter AMP 106, Intra2N×2N 107, IntraN×N 108, and IntraPCM 109. Here, each predictive coding may go through a process of performing prediction, performing transform coding with respect to a residual signal after the prediction, and performing entropy coding by quantizing a transform coefficient thereof.

Using such various methods, predictive coding may be performed with respect to each CU block. In operation 110, if a size of the CU block is greater than a size of a predetermined smallest coding unit (SCU) (NO in 110), the CU block may be partitioned into sub-blocks, for example, 4 sub-blocks. With respect to each of the sub-blocks, a CU coding operation may be performed in the same order, in operation 112. If a size of the CU block is not greater than a size of a predetermined SCU (YES in 110), the CU coding operation is finished in operation 111.

Predictive coding may be performed with respect to a single block a number of times using the method described above. The block may be partitioned into smaller blocks, and an optimal block partitioning structure and prediction and coding methods may be determined through a method of repeatedly performing predictive coding using the same method.

Figure 2:
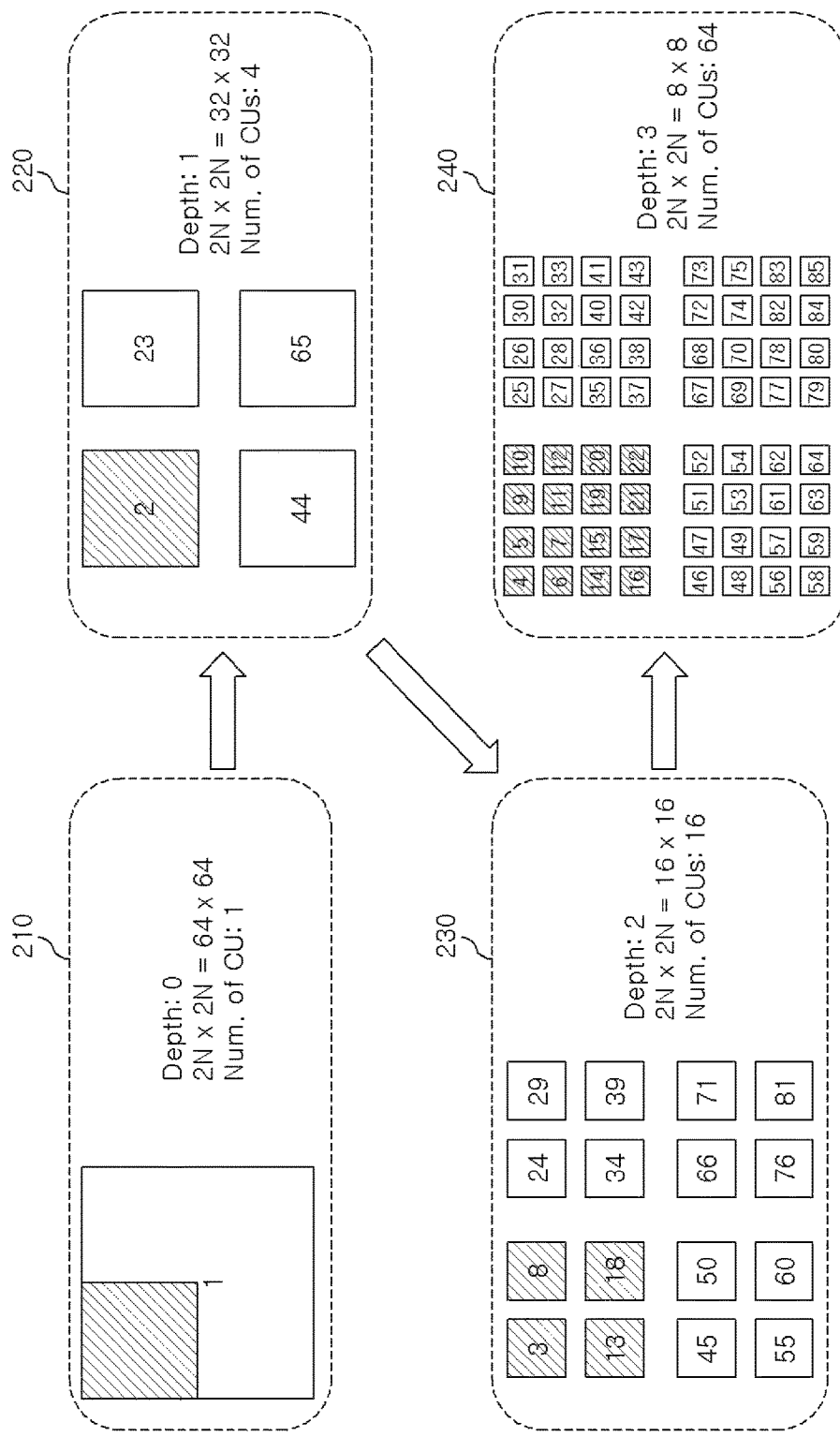
FIG. 2 illustrates an example of a block partitioning structure of HEVC standard.

FIG. 2 illustrates an example of a block partitioning structure of HEVC standard.

In a case in which a single CU block is coded using the method of FIG. 1, the CU block may be coded as a 64×64 block 210 of FIG. 2. This block may be partitioned into four sub-blocks as in a 32×32 block 220. Each block may be partitioned again as in a 16×16 block 230, and each block may be partitioned further again as in an 8×8 block 240.

Here, in a case in which coding of the CU block is performed as shown in the flowchart of FIG. 1, the coding may be performed with respect to each block in a numerical order. The CU block may be partitioned into such various blocks, and an optimal coding method may be determined in an aspect of coding by comparing a coding performance for a single block with a coding performance when the block is partitioned into four sub-blocks. In the above method, the CU block is partitioned into various blocks and coding is performed thereon as shown in FIG. 2. Thus, a computational complexity thereof is relatively great.

Figure 3:
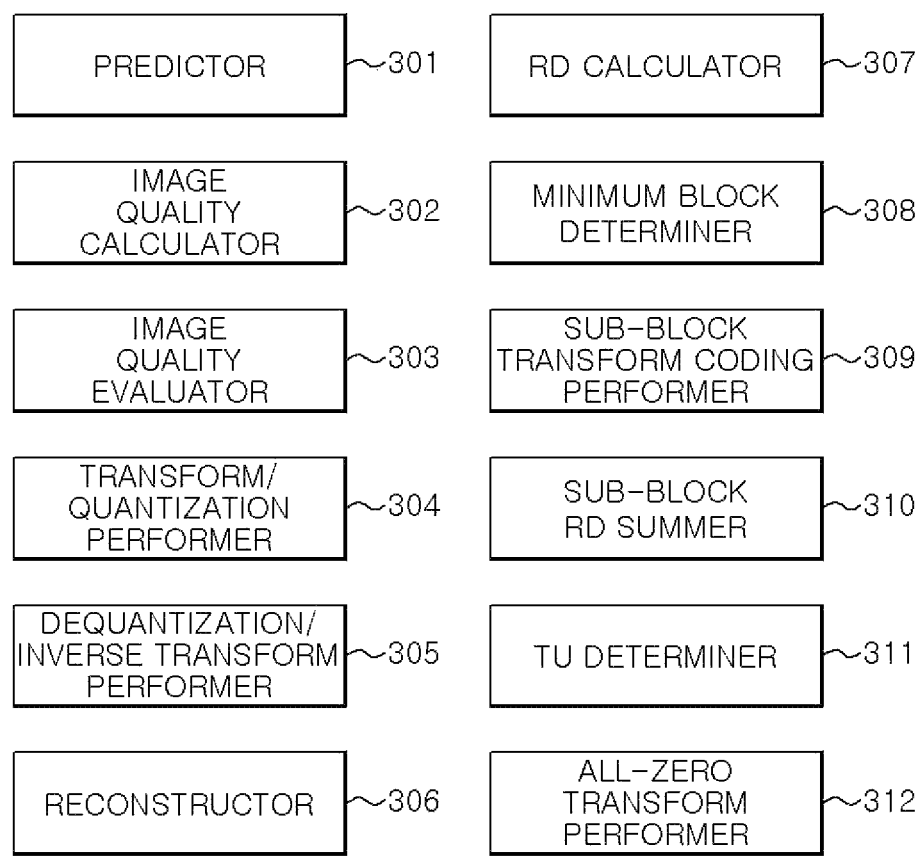
FIG. 3 is a block diagram illustrating an apparatus for fast transform coding according to an example embodiment.

FIG. 3 is a block diagram illustrating an apparatus for fast transform coding according to an example embodiment.

Referring to FIG. 3, the apparatus for fast transform coding may include a predictor 301, an image quality calculator 302, an image quality evaluator 303, a transform/quantization performer 304, a dequantization/inverse transform performer 305, a reconstructor 306, a rate-distortion (RD) calculator 307, a minimum block determiner 308, a sub-block transform coding performer 309, a sub-block RD summer 310, a transform unit (TU) determiner 311, and an all-zero transform performer 312. However, example embodiments are not limited thereto.

The predictor 301 performs prediction with respect to a current block through any one prediction method. For example, the prediction method may include various methods such as intra prediction and inter prediction.

The image quality calculator 302 evaluates and calculates a prediction error, for example, a visible residual (VR), with respect to the current block to calculate an image quality. To calculate the image quality, a subjective evaluation method such as just noticeable distortion (JND) that evaluates whether a human is able to perceive may be utilized. A number of visible residual-signals (NVR) value may be calculated based on the following equation.

$$NVR(i) = \sum_{y=0}^{H_i} \sum_{x=0}^{W_i} VR(i, x, y)$$

Here, $H_i$ and $W_i$ denote a vertical pixel and a horizontal pixel of a block, respectively. Here, i denotes an index for a block, x and y are coordinates in the block. Here, a visible residual (VR) is defined as follows.

$$VR(i, x, y) = \begin{cases} 1, & |orig(i, x, y) - pred(i, x, y)| > JND_z(i, x, y) \\ 0, & \text{otherwise} \end{cases}$$

Here, orig(i, x, y) denotes an original image, and pred(i, x, y) denotes a prediction image. If an absolute value of a difference between the original image and the prediction image is greater than a JND value, the value of VR may be set to "1". Otherwise, the value of VR may be set to "0".

Here, a value of $JND_s$ in a spatial domain may be evaluated and calculated as follows.

$$JND_s(x,y) = \max\{T^i(x,y), T^t(x,y)\}$$

$$T'(x, y) = \begin{cases} 17 \times \left(1 - \sqrt{\frac{bg(x, y)}{127}}\right) + 3, & \text{if } bg(x, y) \le 127, \\ \frac{3}{128} \times (bg(x, y) - 127) + 3, & \text{otherwise} \end{cases}$$

$$T(x,y) = mg(x,y)\alpha(bg(x,y)) + \beta(bg(x,y))$$

Here, bg, mg denotes an average background brightness value, and mg denotes an average brightness value in a region block.

The image quality evaluator 303 is configured to determine a transform coding to method based on the prediction error calculated by the image quality calculator 302. For example, by evaluating an image quality based on the NVR value calculated by the image quality calculator 302, all-zero transform, that is, whether to perform coding by setting all transform coefficients to "0" or perform transform coding is determined.

The transform/quantization performer 304 performs transform based on discrete cosine transform (DCT) or discrete sine transform (DST), and quantizes a result value.

The dequantization/inverse transform performer 305 performs dequantization and inverse transform with respect to a transform coefficient obtained by the transform/quantization performer 304.

The reconstructor 306 generates a reconstruction signal by summing a prediction signal generated by the predictor 301 and a reconstruction residual signal obtained by the dequantization/inverse transform performer 305.

The RD calculator 307 calculates an RD cost related to the reconstruction signal generated by the reconstructor 306. The RD cost may be calculated based on a coding data quantity necessary until the reconstruction signal generated by the reconstructor 306 is obtained. For example, the reconstruction signal obtained by the reconstructor 306 and the coding data quantity necessary until the reconstruction signal is obtained may be calculated, and the RD cost may be calculated through a weighted average of the two quantities.

The minimum block determiner 308 determines whether a size of the current block is a minimum block size. If the size of the current block is not the minimum block size, the current block may be partitioned into a plurality of sub-blocks, for example, four sub-blocks.

The sub-block transform coding performer 309 partitions the current block into four sub-blocks, and performs transform coding with respect to each sub-block when the minimum block determiner 308 determines that the size of the current block is not the minimum block size.

The sub-block RD summer 310 calculates an RD cost by summing evaluated RD values with respect to the four sub-blocks when sub-block transform coding is completed through four sub-block transform coding performers 309.

The TU determiner 311 determines a smaller cost between the RD cost for the current block and the RD cost for the sub-blocks, and selects a transform coding method for the current block by determining a TU based on the determined cost.

The all-zero transform performer 312 performs coding by setting all transform coefficients to "0" in a case in which transform coefficient coding is unnecessary in a subjective aspect based on the NVR value calculated by the image quality evaluator 303.

HEVC compression technology has a block-based prediction/transform/quantization structure. This structure is used in H.264/advanced video coding (AVC) and previous coding standard technology. HEVC partitions an image into block structures of smaller units, uses the block structures as coding units, performs prediction based on the coding units, and performs transform of a residual signal after the prediction. In performing such transform, the unit of block may be the same as a unit block size of prediction. However, transform may be performed irrespective of the unit of prediction. In such transform coding, various block partitioning structures may be used, and a great computational complexity is also required for the process.

An example embodiment may provide an apparatus for speeding up coding using a method of skipping transform coding with respect to a prediction error if a human is unable to perceive the prediction error, in a case of evaluating the prediction error in an aspect of subjective image quality after prediction. Each coding block is partitioned into a number of prediction blocks, and prediction is performed using various prediction methods. After the prediction is performed in this way, transform coding is performed with respect to an unpredicted residual signal. The residual signal may be partitioned into recursive partitioning structures. In this process, in a case in which it is not easy to perceive the residual signal in a predetermined block unit with a human sight, the residual signal in the block is not coded and transform coding is not applied to a smaller partitioning structure corresponding to a position thereof, whereby fast transform coding may be achieved.

Figure 4:
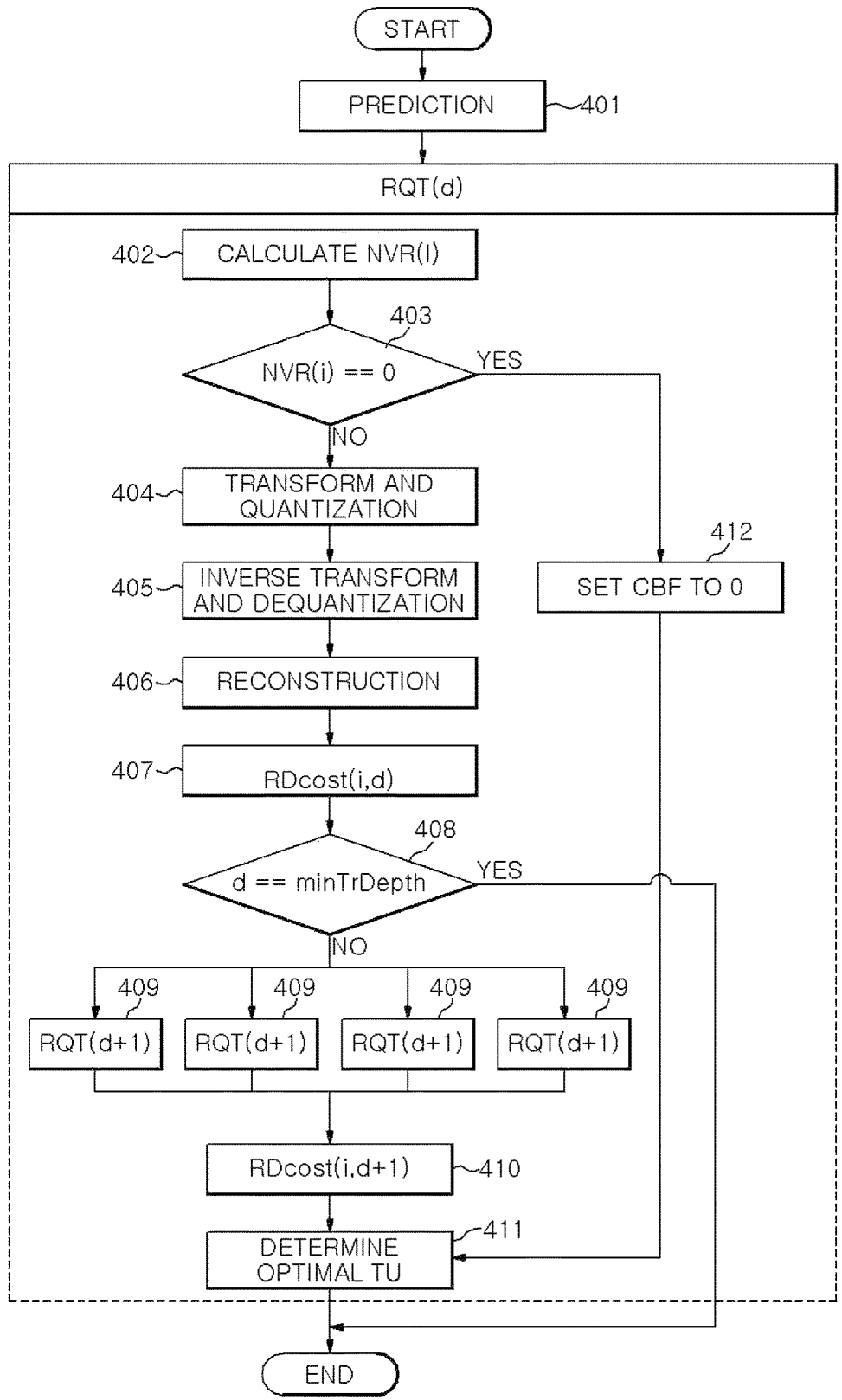
FIG. 4 is a flowchart illustrating a method for fast transform coding according to an example embodiment.

FIG. 4 is a flowchart illustrating a method for fast transform coding according to an example embodiment. Hereinafter, the method for fast transform coding will be described with reference to the flowchart of FIG. 4.

In operation 401, the predictor 301 performs prediction using a single prediction method. For example, after intra prediction or inter prediction is performed, transform coding is performed with respect to a corresponding block through operations 402 through 412 of FIG. 4. Residual Quad-Tree (RQT) transform coding at a certain depth d is implemented.

In operation 402, the image quality calculator 302 calculates an NVR value which is a value related to a prediction error with respect to a current block. As described above, the NVR value may be calculated to evaluate a level of difficulty for human perception based on a comparison with a JND value.

In operation 403, the image quality evaluator 303 determines whether to perform coding with all-zero transform or perform transform coding based on the NVR value calculated in operation 402. In this example, the NVR value is compared to "0". However, the comparison may be performed using a predetermined reference range such as a different positive value in some cases. In this operation, whether coding of a transform coefficient is needed is determined in a subjective aspect.

When the NVR value is "0" in operation 403 (YES in operation 403), operation 412 is performed. In operation 412, the all-zero transform performer 312 performs coding by setting all transform coefficients, for example, coded block flags (CBFs) to "0".

When the NVR value is not "0" in operation 403 (NO in operation 403), the transform/quantization performer 304 performs transform based on DCT or DST, and quantizes a result value in operation 404.

In operation 405, the dequantization/inverse transform performer 305 performs dequantization and inverse transform on the quantized transform coefficient obtained in operation 404.

In operation 406, the reconstructor 306 obtains a reconstruction signal by summing a prediction signal obtained in operation 401 and a reconstruction residual signal obtained in operation 405.

In operation 407, the RD calculator 307 obtains the reconstruction signal obtained in operation 406 and a coding data quantity necessary until the reconstruction signal is obtained, and calculates an RD cost RDcost(i, d) through a weighted average of the two quantities.

In operation 408, the minimum block determiner 308 determines whether a size of the current block is a minimum block size. In response to determination that the size of the current block is the minimum block size (YES in operation 408), the method is terminated. Conversely, in response to determination that the size of the current block is not the minimum block size, a process of partitioning the current block into sub-blocks is performed.

In response to determination that the size of the current block is not the minimum block size in operation 408 (NO in operation 408), the sub-block transform coding performer 309 partitions the current block into four sub-blocks and performs transform coding with respect to each sub-block (i.e., a next depth d+1) in operation 409.

In operation 410, the sub-block RD summer 310 calculates an RD cost by summing evaluated RD values with respect to the four sub-blocks when sub-block transform coding is completed through the operation performed by four sub-block transform coding performers 309.

In operation 411, the TU determiner 311 evaluates a smaller cost by comparing the RD cost for the current block and the RD cost for the sub-blocks, sets a case of the smaller cost as a TU, and determines a transform coding method for the current block.

According to the method for fast transform coding as described above, a level of difficulty for human perception is evaluated based on a JND based evaluation standard using a method of evaluating a subjective image quality. In response to determination that a residual signal is not perceived by a human based on the evaluated value, coding is performed under the assumption that there is no residual signal, rather than performing transform coding, whereby a coding speed may be doubled with little loss of the image quality.

What is claimed is:

1. A method for fast transform coding in image compression, the method comprising:
   performing prediction with respect to a current block;
   calculating a prediction error with respect to the current block;
   performing transform and quantization with respect to the current block;
   performing dequantization and inverse transform with respect to a transform coefficient generated through the transform and quantization;
   generating a reconstruction signal by summing a prediction signal generated in the performing of the prediction and a residual signal generated in the performing of the dequantization and inverse transform;
   calculating a rate-distortion (RD) cost related to the reconstruction signal;
   determining whether a size of the current block is a minimum block size;
   partitioning the current block into a plurality of sub-blocks, and performing transform coding with respect to the sub-blocks in response to determination that the size of the current block is not the minimum block size;
   summing respective RD costs for the plurality of sub-blocks; and
   determining a transform unit (TU) for transform coding based on a comparison of the RD cost for the current block and the RD costs for the sub-blocks,
   wherein the prediction error is calculated based on a visible residual (VR),
   wherein the VR is calculated based on the following equation:

$$VR(i, x, y) = \begin{cases} 1, & |orig(i, x, y) - pred(i, x, y)| > JND_s(i, x, y) \\ 0, & \text{otherwise} \end{cases},$$

and,
wherein VR(i, x, y) denotes the visible residual, orig(i, x, y) denotes an original image, pred(i, x, y) denotes a prediction image, i denotes an index for a block, x and y are coordinates in the block, and $JND_s$(i, x, y) denotes a JND value in a spatial domain.

2. The method of claim 1, wherein the calculating of the prediction error with respect to the current block comprises calculating the prediction error with respect to the current block based on a comparison with a just noticeable distortion (JND) value for evaluating whether a human is able to perceive.

3. The method of claim 1, further comprising:
   determining a transform coding method based on the prediction error.

4. The method of claim 1, further comprising:
   setting all transform coefficients to "0" in a case in which the prediction error is within a predetermined reference range.

5. A method for fast transform coding in image compression, the method comprising:
   performing prediction with respect to a current block;
   calculating a number of visible residual-signals (NVR) value with respect to the current block;
   performing transform and quantization with respect to the current block in response to the NVR value not being zero;
   performing dequantization and inverse transform with respect to a transform coefficient generated through the transform and quantization;
   generating a reconstruction signal by summing a prediction signal generated in the performing of the prediction and a residual signal generated in the performing of the dequantization and inverse transform;
   calculating a rate-distortion (RD) cost related to the reconstruction signal;
   determining whether a size of the current block is a minimum block size;
   partitioning the current block into a plurality of sub-blocks, and performing transform coding with respect to the sub-blocks in response to determination that the size of the current block is not the minimum block size;
   summing respective RD costs for the plurality of sub-blocks; and
   determining a transform unit (TU) for transform coding based on a comparison of the RD cost for the current block and the RD costs for the sub-blocks,
   wherein the NVR value is calculated based on the following equations, $$NVR(i) = \sum_{y=0}^{H_i} \sum_{x=0}^{W_i} VR(i, x, y),$$

and $$VR(i, x, y) = \begin{cases} 1, & |orig(i, x, y) - pred(i, x, y)| > JND_s(i, x, y) \\ 0, & \text{otherwise} \end{cases},$$

and
wherein $H_i$ denotes a vertical pixel of the current block, the $W_i$ denotes a horizontal pixel of the current block, VR(i, x, y) denotes the visible residual, orig(i, x, y) denotes an original image, pred(i, x, y) denotes a prediction image, i denotes an index for a block, x and y are coordinates in the block, and $JND_s$(i, x, y) denotes a JND value in a spatial domain.

6. The method of claim 5, wherein the calculating of the prediction error with respect to the current block comprises calculating the prediction error with respect to the current block based on a comparison with a just noticeable distortion (JND) value for evaluating whether a human is able to perceive.

7. The method of claim 5, further comprising:
   determining a transform coding method based on the NVR value.

8. The method of claim 5, further comprising:
   setting all transform coefficients to "0" in a case in response to the NVR value being zero.

* * * * *